(12) United States Patent
Long et al.

(10) Patent No.: US 7,392,513 B2
(45) Date of Patent: Jun. 24, 2008

(54) METHODS AND APPARATUS FOR MERGING CRITICAL SECTIONS

(75) Inventors: Li Long, Shanghai (CN); Bo Huang, Shanghai (CN); Jinquan Dai, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 774 days.

(21) Appl. No.: 10/804,735

(22) Filed: Mar. 19, 2004

(65) Prior Publication Data

US 2005/0210208 A1    Sep. 22, 2005

(51) Int. Cl.
*G06F 9/45* (2006.01)
*G06F 15/00* (2006.01)

(52) U.S. Cl. .................. 717/155; 711/159; 717/154

(58) Field of Classification Search .................. None
See application file for complete search history.

(56) References Cited

U.S. PATENT DOCUMENTS

| | | | | |
|---|---|---|---|---|
| 6,064,819 | A * | 5/2000 | Franssen et al. | 717/156 |
| 6,745,384 | B1 * | 6/2004 | Biggerstaff | 717/156 |
| 7,089,540 | B2 * | 8/2006 | Ogasawara | 717/140 |
| 2003/0065704 | A1 * | 4/2003 | Buch | 709/107 |

OTHER PUBLICATIONS

Tang et al., Thread Partioning and Scheduling Based On Cost Model, 1997, ACM, pp. 272-281.*
Zoppetti et al., Automatic Compiler Techniques for Thread Coarsening for Multithreaded, 2000, ACM, pp. 306-315.*
Moon et al., Evaluation of Predicated Array Data-Flow Analysis for Automatic Parallelization, 1999, ACM, pp. 84-95.*
Schauser et al., Separation Constraint Partitioning—A New Algorithm for Partitioning Non-strict Programs into Sequential Threads, 1995, ACM, pp. 259-271.*
Tang et al., How "hard" is Thread Partitioning and How "bad" is a List Scheduling Based Partitioning Algorithm?, 1998, ACM, pp. 130-139.*
Haab et al., "Developing Multithreaded Applications: A Platform Consistent Approach", Chap. 4, Synchronization, Intel Corporation, Mar. 2003, pp. 6-7, 74-78.*
Li et al., U.S. Appl. No. 10/714,198, filed Nov. 14, 2003, "*An Apparatus and Method for an Automatic Thread-Partition Compiler*", 42 pages.

* cited by examiner

*Primary Examiner*—Eric B. Kiss
*Assistant Examiner*—Ben C Wang
(74) *Attorney, Agent, or Firm*—Hanley, Flight & Zimmerman, LLC

(57) ABSTRACT

Methods and apparatus for merging critical sections are disclosed. An example disclosed system estimates the cost of merging a first critical section and a second critical section using a dataflow analysis on the first and second critical sections. In the example system, the first critical section and the second critical section are merged based on a least expensive cost of merging critical sections.

25 Claims, 4 Drawing Sheets

1: Enter (c1)
2: Access ({a})
3: Enter (c2)
4: Access ({a,b})
5: Leave (c1)
6: Access ({b})
7: Leave (c2)
8: Enter (c3)
9: Access ({c})
10: Leave(c3)

FIG. 3

1: Enter (1)
2: Access ({a})
3: ~~Enter (c2)~~
4: Access ({a,b})
5: ~~Leave (c1)~~
6: Access ({b})
7: Leave (1)
8: Enter (2)
9: Access ({c})
10: Leave (2)

FIG. 4

METHODS AND APPARATUS FOR MERGING CRITICAL SECTIONS

TECHNICAL FIELD

The present disclosure pertains to critical sections and, more particularly, to methods and apparatus for merging critical sections.

BACKGROUND

In a shared address space architecture, all parts of memory are accessible to all threads, processes, and/or processors. As a result, shared address space programming paradigms concentrate on methods for expressing concurrency and synchronization of data accesses. A significant aspect of creating correctly threaded programs involves synchronizing data accesses between concurrent threads and/or processes.

Most compilers provide explicit support for critical sections (e.g., a section of program instructions that must be executed atomically (i.e., as a whole) such as, for example, accessing a shared address space) using mutual exclusion locks (e.g., mutexes). A virtual mutex is a data structure within a program that is used to control access to shared data. Virtual mutexes are managed (e.g., locked, unlocked, etc.) using software instructions embedded within a program. During program execution, a thread must lock a virtual mutex before the thread can access shared data protected by the virtual mutex. If the virtual mutex is locked by a different thread, the thread is blocked from accessing the shared data and must wait for the virtual mutex to be unlocked before the thread can lock the mutex and enter the critical section. The virtual mutex must be unlocked when a thread leaves the critical section to enable other threads to access the shared data. As a result, critical sections have a serialization effect on threads that access the same shared data.

Parallel multi-threaded architectures provide resources to implement physical mutexes. Physical mutexes function in the same manner as virtual mutexes but are associated with hardware to implement the synchronization of data accesses rather than using a software data structure. For example, the Intel® Internet Exchange Architecture (IXA) family of network processors provides 15 signals for synchronizing of data accesses within one microengine (e.g., a form of microprocessor in the Intel® IXA family of network processors) and/or between two different microengines. These 15 signals may be used as physical mutexes.

A compiler that is configured to generate programs for these parallel multi-threaded processors must be configured to allocate these physical mutexes to the virtual mutexes used in the program. Due to the limited number of physical mutexes and potentially larger number of virtual mutexes used in the program, the compiler may attempt to merge critical sections until the number of physical mutexes equals the number of critical sections. However, it is important to minimize the size of the merged critical sections to prevent significant performance degradation.

BRIEF DESCRIPTION OF THE DRAWINGS

FIG. 3 is an example set of program instructions containing critical sections.

FIG. 4 is the example set of program instructions of FIG. 3 after critical sections have been merged and physical mutual exclusion locks have been assigned.

DETAILED DESCRIPTION

Although the following discloses example systems, including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the following describes example systems, persons of ordinary skill in the art will readily appreciate that the examples are not the only way to implement such systems.

Figure 1:
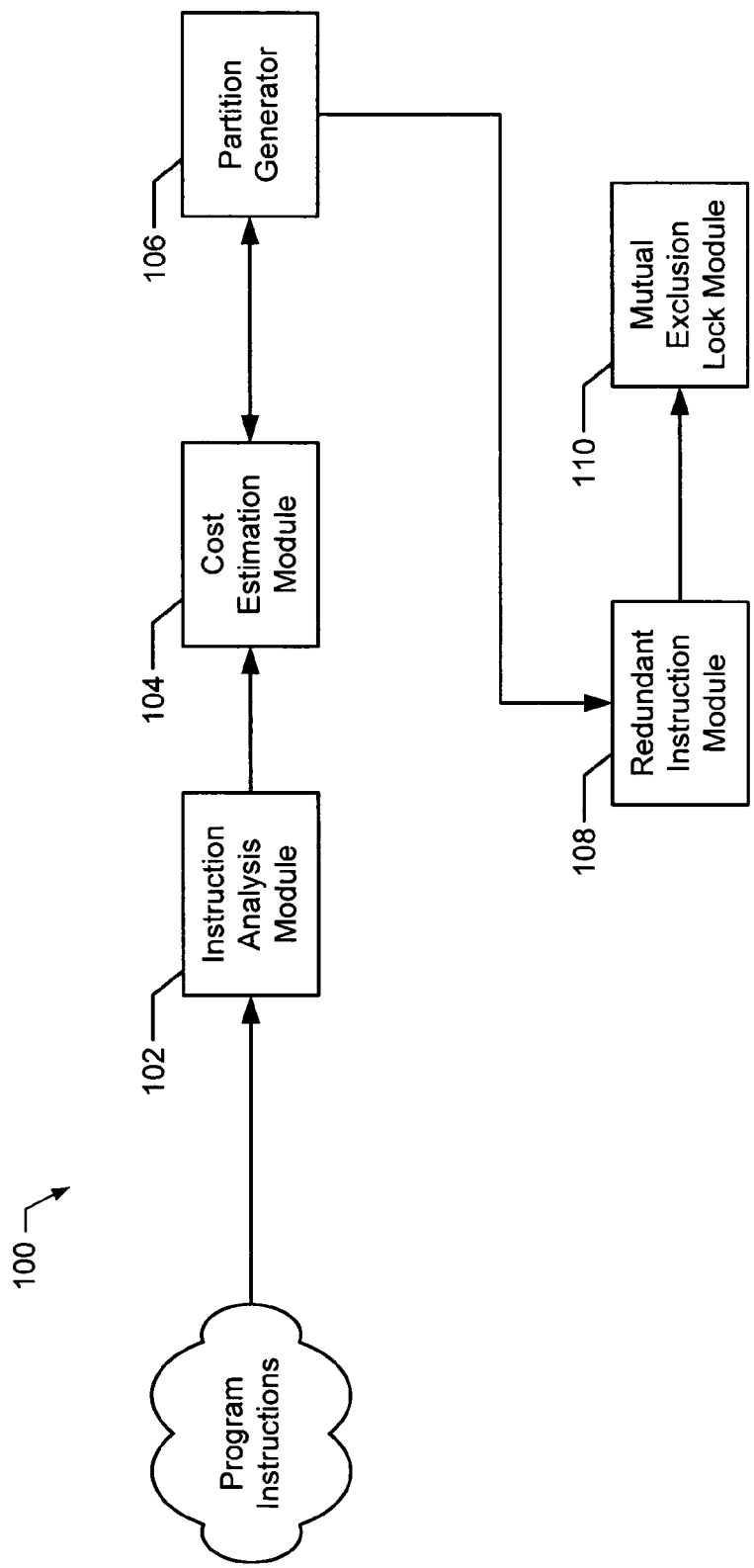
FIG. 1 is a block diagram of an example system for merging critical sections.

FIG. 1 is a block diagram of an example system 100 for merging critical sections. The example system 100 may be implemented as several components of hardware, each of which is configured to perform one or more functions, may be implemented in software where one or more software and/or firmware programs are used to perform the different functions, or may be a combination of hardware and software. In this example, the example system 100 includes an instruction analysis module 102, a cost estimation module 104, a partition generator 106, a redundant instruction module 108, and a mutual exclusion lock module 110.

The instruction analysis module 102 is configured to receive program instructions and perform a dataflow analysis on the program instructions. Although there are several methods of dataflow analysis (e.g., forward conjunctive dataflow analysis, backward disjunctive dataflow analysis, and/or backward conjunctive dataflow analysis) a forward disjunctive dataflow analysis is chosen to analyze the program instructions.

The instruction analysis module 102 may also be configured to generate a vector (e.g., an array) to represent the instructions within each critical section (e.g., an instructions vector) based on the results of the forward disjunctive dataflow analysis. The instructions vector contains elements for all the critical sections in the program and each element may contain a set of instructions contained in the critical section with which the element is associated. Instructions to enter and/or exit the critical section (e.g., instructions to lock and unlock a mutex) are not included in the set of instructions contained in the element of the instructions vector. An example instructions vector (e.g., Instructions) is described below in connection with FIG. 2 and FIG. 3.

The cost estimation module 104 is configured to determine a cost of merging critical sections based on the instructions vector generated by the instruction analysis module 102. The cost estimation module 104 may also be configured to generate a cost matrix to represent the costs of merging any two critical sections. The cost of merging two critical sections may be a measure of a number of instructions that belong to one of the critical sections and that do not belong to both critical sections.

The partition generator 106 is configured to merge critical sections. The partition generator 106 analyzes the cost matrix and determines the element in the cost matrix with the smallest value (e.g., the least expensive merge operation). The least expensive merge operation may be determined by sorting the elements of the cost matrix from smallest to largest. However, a person of ordinary skill in the art will readily appreciate that there are many other methods that may be used to sort the elements of the cost matrix. The partition generator 106 merges the two critical sections associated with the least expensive merge operation in the cost matrix. After the critical sections are merged, the partition generator 106 updates the cost matrix and the instructions vector to reflect the merged critical sections.

The redundant instruction module 108 is configured to remove redundant instructions from the merged critical sections. Example redundant instructions that may be removed are instructions to enter and/or exit a critical section that has been merged with another critical section. The redundant instruction module 108 may generate a vector that indicates if an instruction should be removed (e.g., a redundant vector). The redundant vector may contain an element for each instruction in the critical section to indicate if the instruction should be removed or not. The redundant vector may be generated using the results of a dataflow analysis performed by the redundant instruction module 108 similar to the instruction analysis module 102. Alternatively, the results of the of the dataflow analysis performed by the instruction analysis module 102 may be used to generate the redundant vector. An example redundant vector (e.g., Redundant) is described below in connection with FIG. 2 and FIG. 3.

The mutual exclusion lock module 110 is configured to assign a physical mutex to a merged critical section. The mutual exclusion lock module 110 may assign one physical mutex to one merged critical section. A person of ordinary skill in the art will readily appreciate there are several known methods that may be used to implement the mutual exclusion lock module 110 and to assign physical mutexes to merged critical sections.

Figure 2:
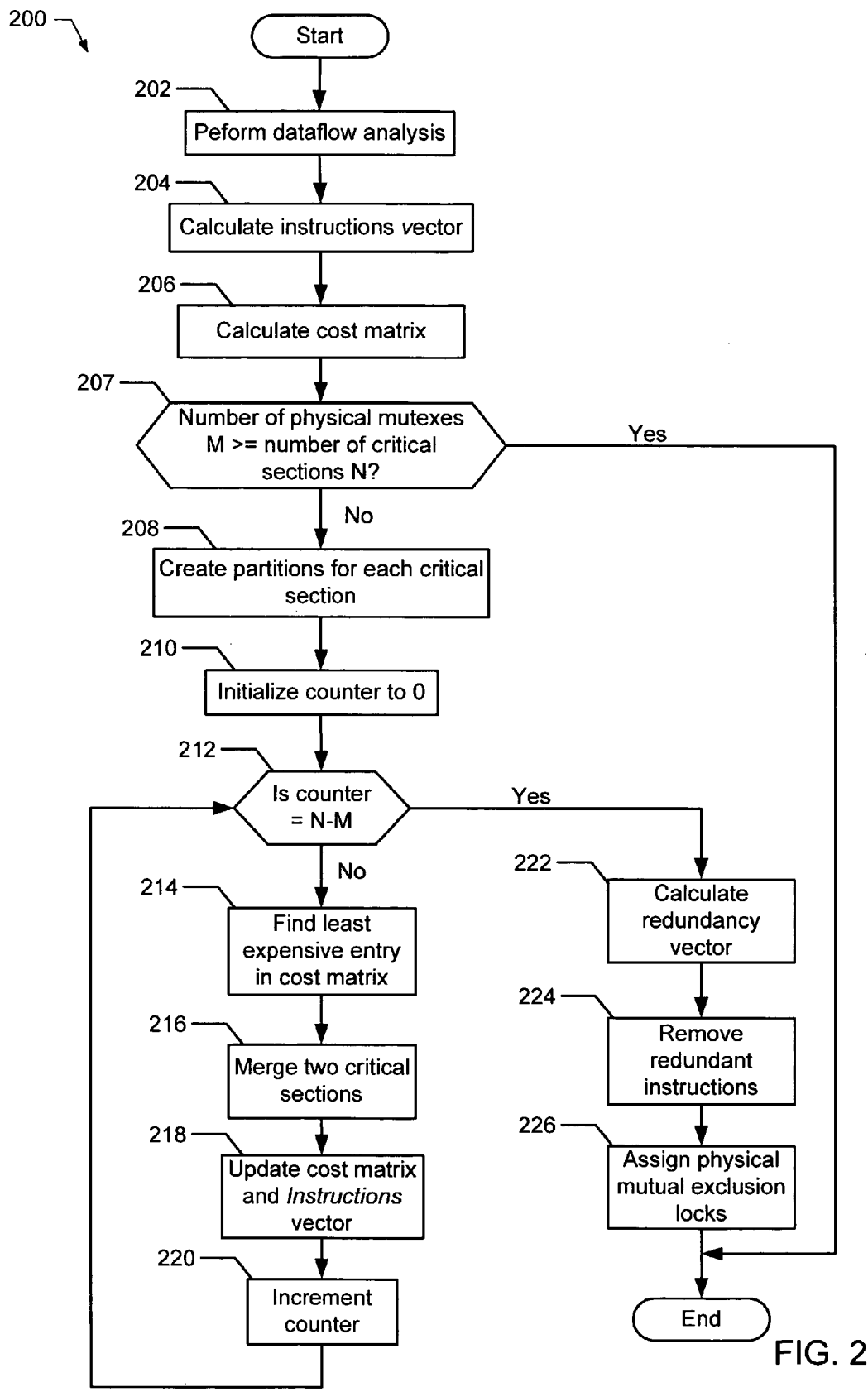
FIG. 2 is a flowchart depicting an example manner in which the system of FIG. 1 may be configured to merge critical sections.

FIG. 2 is a flowchart depicting an example manner in which the system of FIG. 1 may be configured to merge critical sections. Preferably, the illustrated example process 200 is embodied in one or more software programs that are stored in one or more memories (e.g., the flash memory 312 and/or the hard disk 320 of FIG. 5) and executed by one or more processors (e.g., the processor 306 of FIG. 5) in a well-known manner. However, some or all of the blocks of the process 200 may be performed manually and/or by some other device. Although the process 200 is described with reference to the flowchart illustrated in FIG. 2, a person of ordinary skill in the art will readily appreciate that many other methods of performing the process 200 may be used. For example, the order of the blocks may be altered, the operation of one or more blocks may be changed, blocks may be combined, and/or blocks may be eliminated.

In general, the example process 200 merges critical sections by first performing a dataflow analysis. From the results of the dataflow analysis, a vector of instructions contained within each critical section is generated. A cost matrix indicating an estimated cost of merging two critical sections is generated from the vector of instructions. The cost matrix is analyzed and critical sections are merged based on the estimated cost of merging the critical sections. The critical sections are merged until the number of physical mutexes equals the number of critical sections. The merged critical sections are analyzed and redundant instructions are removed from the merged critical sections. A physical mutex is then assigned to each merged critical section.

Now turning in detail to FIG. 2, the example process 200 begins when the instruction analysis module 102 (FIG. 1) receives a set of program instructions and performs a dataflow analysis on the set of program instructions (block 202). More specifically, the instruction analysis module 102 performs a forward disjunctive dataflow analysis on the set of program instructions. The forward disjunctive dataflow analysis is well known to those of ordinary skill in the art and, thus, is not described in greater detail herein. As a result of the forward disjunctive analysis, information describing instructions and/or critical sections is obtained. For example, information indicating if an instruction belongs to a critical section (e.g., contained within the instruction to enter and the instruction to exit a critical section) and/or if an instruction is used to enter and/or exit a critical section may be obtained.

From the results of the dataflow analysis (block 202), a vector that maps program instructions to critical sections is formed by the instruction analysis module 102 (e.g., an instructions vector) (block 204). The instruction vector may contain a number of elements equal to the number of critical sections and each element in the vector may be a set of instructions that belongs to each critical section. The instructions used to enter and/or exit the critical section (e.g., to lock and unlock a mutex) are not included in the vector.

FIG. 3 is an example set of program instructions that may be received by the dataflow analysis module 102. The set of program instructions contains three critical sections (e.g., c1, c2, and c3) and three shared memory locations (e.g., a, b, and c). After the instruction analysis module 102 performs the forward disjunctive dataflow analysis (block 202), the instructions vector is generated (block 204). The instructions vector (e.g., Instructions) contains three elements because the example set of program instructions of FIG. 3 contains three critical sections. Each element of Instructions contains instructions that are associated with the critical section. The resulting instructions vector may be depicted as shown below.

Instructions[c1]={2, 4}
Instructions[c2]={4, 6}
Instructions[c3]={9}

Note that instructions 1, 3, 5, 7, 8, and 10 are not included in elements of the Instructions because these instructions are used to enter and exit the critical sections.

Returning to FIG. 2, after the instructions vector is generated (block 204), the cost estimation module 104 uses the instructions vector to determine an estimated cost of merging two critical sections (block 206). An example measure of the cost of merging two critical sections may be the number of instructions that are contained in one of the critical sections and are not contained in both critical sections, excluding the instructions to enter and/or exit a critical section. Mathematically, the cost of merging two critical sections (e.g., critical sections ci and cj) may be represented by the equation shown below.

Cost of merging the critical section $c_i$ and the critical section $c_j$=Cardinality of (Instructions[$c_i$]∪Instructions[$c_j$])−Cardinality of (Instructions[$c_i$]∩Instructions[$c_j$]).

In other words, the cost of merging two critical sections may be the number of instructions in the critical sections that do not belong to both critical sections. For example, in the example set of program instructions of FIG. 3, the cost of merging the critical section c1 and the critical section c2 is equal to 2. Instruction 2 belongs to the critical section c1, instruction 6 belongs to the critical section 2 and instruction 4 belongs to both critical section c1 and critical section c2. However, a person of ordinary skill in the art will readily appreciate that there are several methods to measure a cost of merging critical sections.

After the cost estimation module 104 determines the estimated cost of merging the critical sections, the cost estimation module 104 generates a cost matrix (e.g., Cost) to represent the cost of merging critical sections (block 206). An example cost matrix generated from the set of program instructions of FIG. 3 is shown below.

Cost[c1, c2]=2
Cost[c1, c3]=3
Cost[c2, c3]=3

The cost matrix is a triangular matrix because Cost[ci, cj]=Cost[cj, ci].

After the cost matrix is generated (block 206), the partition generator 106 determines if a number of physical mutexes M is greater than or equal to a number of critical sections N (block 207). The partition generator 106 may determine the number of critical sections N by determining the number of elements in the instruction vector and/or may use any other known method to determine the number of critical sections.

In addition, there are several methods the partition generator 106 may use to determine the number of physical mutexes M. For example, the partition generator 106 may query the processor 306 (FIG. 5) for the number of physical mutexes M. If the number of physical mutexes M is greater than or equal to the number of critical sections N (block 207), the process ends because there is no need to merge critical sections. If the number of physical mutexes M is less than the number of critical sections N (block 207), control advances to block 208.

The partition generator 106 creates a partition for each critical section identified by the dataflow analysis (block 208). Partitions may be used to represent critical sections as the critical sections are merged. For example, for the set of program instructions shown in FIG. 3, the partition generator 106 generates three partitions (e.g., {{c1}, {c2}, and {c3}}) for the three critical sections. As critical sections are merged, the partitions are merged. For example if the critical section c1 and the critical section c2 are merged, the resulting partitions are {{c1, c2}, {c3}}. A counter is then initialized to 1 (block 210). However, a person of ordinary skill in the art will readily appreciate that the counter may be initialized to zero or some other number to suit a particular application.

The value of the counter is compared to a difference between the number of critical sections M and the number of physical mutexes N (e.g., is counter=N−M ?) (block 212). If the counter is not equal to the difference, the partition generator 106 finds a least expensive merge operation in the cost matrix (e.g., the smallest value in the cost matrix) having associated critical sections that are not in the same partition (block 214). One example method to determine the least expensive merge operation in the cost matrix is to sort the values of the cost matrix from least expensive to most expensive. The partition generator 106 chooses the least expensive merge operation in the cost matrix where the two critical sections are not within the same partition.

After the least expensive merge operation is determined (block 214), the two critical sections associated with the least expensive merge operation are merged into a single partition (block 216). The values of the cost matrix and the instructions vector are then updated to reflect the merged critical sections (block 218). For example, if the two critical sections that are merged are critical sections c1 and c2 of FIG. 3, Instructions and Cost may be updated sequentially as shown below.

Instructions[c1]=Instructions[c2]=Instructions[c1]∪Instructions[c2];

Cost[c1, $ci$]=Cardinality of (Instructions[c1]∪Instructions[$ci$])−Cardinality of (Instructions[c1]∩Instructions[$ci$]) where $i!=1$;

Cost[c2, $ci$]=Cardinality of (Instructions[c2]∪Instructions[$ci$])−Cardinality of (Instructions [c2]∩Instructions [$ci$]) where $i!=2$;

Cost[c1, c2]=0.

After the cost matrix and the instructions vector are updated (block 218), the counter is incremented (block 220) and control returns to block 212.

If the counter is equal to the difference between the number of critical sections M and the number of physical mutexes N, the redundant instruction module 108 determines a redundancy vector (e.g., a redundant vector) (block 222). The redundancy vector is generated to indicate whether an instruction in the set of program instructions is an instruction to enter a critical section (e.g., instructions 1, 3, and 8 of FIG. 3) and/or an instruction to exit a critical section (e.g., instructions 5, 7, and 10 of FIG. 3). The redundancy vector may be generated from the results of the dataflow analysis from the instruction analysis module 102 (block 202) and/or the redundant instruction module 108. The elements of the redundant vector (e.g., Redundant) may be Boolean values and may be determined as shown below.

Redundant[ ]=1 if i is Enter(c) or Leave(c) and critical section c is contained within another critical section.

For example, the values of Redundant for the set of program instructions in FIG. 4 may be depicted as shown below.

Redundant[1]=0
Redundant[3]=1
Redundant[5]=1
Redundant[7]=0
Redundant[8]=0
Redundant[10]=0

Instructions 3 and 5 are redundant because they are contained within critical section 1 (e.g., between instruction 1 and instruction 7).

After the redundancy vector is calculated (block 222), the redundant instruction module 108 uses the redundancy vector to remove the redundant instructions (block 224). The redundant instruction module 108 may analyze each element in the redundant vector and remove the elements that are determined to be redundant (e.g., an element having a value of 1).

After the redundant instructions have been removed (block 224), the mutual exclusion lock module 110 assigns a physical mutex to each merged partition (block 226). The physical mutexes may be assigned to the merged partitions in any order. A person of ordinary skill in the art will readily appreciate there are many methods to assign the physical mutexes to the merged partition.

FIG. 4 illustrates the example set of program instructions of FIG. 3 after critical sections have been merged, the redundant instructions have been removed, and the physical mutexes have been assigned. Physical mutexes 1 and 2 are allocated to the merged critical section {c1, c2} and critical section {c3}, respectively, as illustrated in instructions 1, 7, 8, and 10. Instructions 3 and 5 have been removed because critical sections c1 and c2 were merged together and instructions 3 and 5 became redundant.

Figure 5:
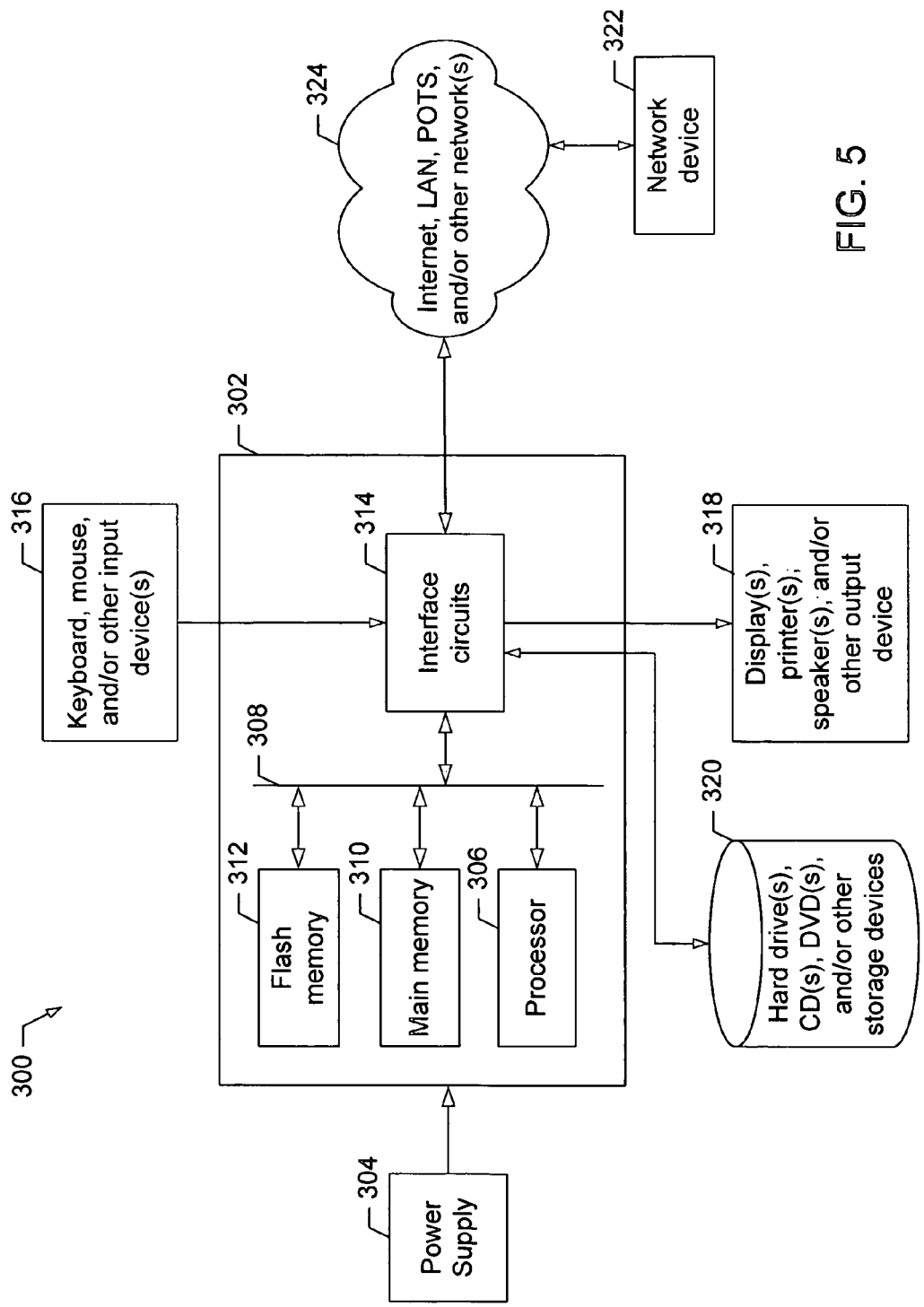
FIG. 5 is a block diagram of an example processor system that may be used to implement the example methods and apparatus disclosed herein

FIG. 5 is a block diagram of an example computer system illustrating an environment of use for the disclosed system. The computer system 300 may be a personal computer (PC) or any other computing device. In the example illustrated, the computer system 300 includes a main processing unit 302 powered by a power supply 304. The main processing unit 302 may include a processor 306 electrically coupled by a system interconnect 308 to a main memory device 310, a flash memory device 312, and one or more interface circuits 314. In an example, the system interconnect 308 is an address/data bus. Of course, a person of ordinary skill in the art will readily appreciate that interconnects other than busses may be used to connect the processor 306 to the other devices 310, 312, and/or 314. For example, one or more dedicated lines and/or a crossbar may be used to connect the processor 306 to the other devices 310, 312, and/or 314.

The processor 306 may be any type of processor, such as a processor from the Intel Pentium® family of microprocessors, the Intel Itanium® family of microprocessors, the Intel Centrino® family of microprocessors, and/or the Intel XScale® family of microprocessors. In addition, the processor 306 may include any type of cache memory, such as static random access memory (SRAM). The main memory device 310 may include dynamic random access memory (DRAM) and/or any other form of random access memory. For example, the main memory device 310 may include double data rate random access memory (DDRAM). The main memory device 310 may also include non-volatile memory. In an example, the main memory device 310 stores a software program which is executed by the processor 306. The flash memory device 312 may be any type of flash memory device. The flash memory device 312 may store firmware used to boot the computer system 300.

The interface circuit(s) 314 may be implemented using any type of interface standard, such as an Ethernet interface and/or a Universal Serial Bus (USB) interface. One or more input devices 316 may be connected to the interface circuits 314 for entering data and commands into the main processing unit 302. For example, an input device 316 may be a keyboard, mouse, touch screen, track pad, track ball, isopoint, and/or a voice recognition system.

One or more displays, printers, speakers, and/or other output devices 318 may also be connected to the main processing unit 302 via one or more of the interface circuits 314. The display 318 may be a cathode ray tube (CRT), a liquid crystal display (LCD), or any other type of display. The display 318 may generate visual indications of data generated during operation of the main processing unit 302. The visual indications may include prompts for human operator input, calculated values, detected data, etc.

The computer system 300 may also include one or more storage devices 320. For example, the computer system 300 may include one or more hard drives, a compact disk (CD) drive, a digital versatile disk drive (DVD), and/or other computer audio input/output (I/O) devices.

The computer system 300 may also exchange data with other devices 322 via a connection to a network 324. The network connection may be any type of network connection, such as an Ethernet connection, digital subscriber line (DSL), telephone line, coaxial cable, etc. The network 324 may be any type of network, such as the Internet, a telephone network, a cable network, and/or a wireless network. The network devices 322 may be any type of network devices 322. For example, the network device 322 may be a client, a server, a hard drive, etc.

Although the above discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, although certain methods, apparatus, and articles of manufacture have been described herein, the scope of coverage of this patent is not limited thereto. On the contrary, this patent covers all apparatus, methods and articles of manufacture fairly falling within the scope of the appended claims either literally or under the doctrine of equivalents.

What is claimed is:

1. A method comprising:
    estimating a cost of merging a first set of instructions and a second set of instructions using a dataflow analysis; and
    merging the first and second sets of instructions to form a merged set of instructions based on the cost of merging the first and second sets of instructions, wherein the cost of merging the first and second sets of instructions is associated with instructions that belong to only the first set of instructions and instructions that belong to only the second set of instructions;
    wherein estimating the cost of merging the first and second sets of instructions comprises:
    creating a first vector based on the dataflow analysis, wherein elements of the first vector comprise instructions contained in at least one of the first and second sets of instructions; and
    creating a cost matrix based on the first vector, wherein the cost matrix contains the cost of merging the first and second sets of instructions.

2. A method as defined in claim 1, further comprising:
    estimating a cost of merging the first set of instructions and a third set of instructions; and
    estimating a cost of merging the second set of instructions and the third set of instructions.

3. A method as defined in claim 2, wherein the cost of merging the first and third sets of instructions and the cost of merging the second and third sets of instructions are greater than the cost of merging the first and second sets of instructions.

4. A method as defined in claim 2, wherein the third set of instructions comprises a critical section of instructions.

5. A method as defined in claim 2, wherein the third set of instructions is associated with a critical section.

6. A method as defined in claim 1, further comprising:
    removing redundant instructions from the merged set of instructions; and
    assigning a physical mutual exclusion lock to the merged set of instructions.

7. A method as defined in claim 6, wherein the redundant instructions comprise instructions used for at least one of entering a set of instructions and exiting the set of instructions.

8. A method as defined in claim 1, wherein the first and second sets of instructions are associated with respective first and second critical sections.

9. A method as defined in claim 1, wherein at least one of the first and second sets of instructions is associated with a critical section.

10. A method as defined in claim 1, wherein the dataflow analysis comprises a forward disjunctive dataflow analysis.

11. A method as defined in claim 1, further comprising creating a second vector having elements comprising a redundancy indicator after merging the first and the second set of instructions.

12. A method as defined in claim 1, wherein the cost of merging the first and second sets of instructions is a least expensive element in the cost matrix.

13. A method as defined in claim 1, further comprising updating the first vector and the cost matrix after merging the first and second sets of instructions.

14. A method as defined in claim 1, further comprising creating a partition including the first and the second sets of instructions before the first and second sets of instructions are merged.

15. An apparatus comprising:
a central processor unit; and
a memory including:
an instruction analysis module configured to perform a dataflow analysis;
a cost estimation module configured to determine an estimated cost of merging a first set of instructions and a second set of instructions to form a merged set of instructions;
a partition generator configured to merge the first and second sets of instructions based on the estimated cost of merging the first and second sets of instructions, wherein the cost of merging the first and second sets of instructions is associated with instructions that belong to only the first set of instructions and instructions that belong to only the second set of instructions;
a redundant instruction module configured to remove redundant instructions from the merged set of instructions; and
a mutual exclusion lock module configured to assign a first physical mutual exclusion lock to the merged set of instructions;
wherein the redundant instruction module is configured to create a vector having elements in the vector comprising a redundancy indicator.

16. An apparatus as defined in claim 15, wherein the redundant instruction module is configured to remove redundant instructions comprising instructions for at least one of entering a set of instructions and exiting the set of instructions.

17. An apparatus as defined in claim 15, wherein the instruction analysis module is configured to perform a forward disjunctive dataflow analysis.

18. An apparatus as defined in claim 15, wherein the partition generator is configured to create a partition including the first and second sets of instructions before the first and second sets of instructions are merged.

19. An apparatus as defined in claim 15, wherein the cost estimation module is configured to:
create a first vector based on the dataflow analysis, wherein the elements of the first vector comprise instructions contained in at least one of the first set of instructions and the second set of instructions; and
create a cost matrix based on the first vector, wherein the cost matrix comprises the cost of merging the first and second sets of instructions.

20. An apparatus as defined in claim 19, wherein the partition generator is configured to determine a least expensive merge operation in the cost matrix.

21. A machine readable medium having instructions stored thereon that, when executed, cause a machine to:
estimate a cost of merging a first set of instructions and a second set of instructions using a dataflow analysis;
merge the first and the second sets of instructions to form a merged set of instructions based on the cost of merging the first and second sets of instructions, wherein the cost of merging the first and second sets of instructions is associated with instructions that belong to only the first set of instructions and instructions that belong to only the second set of instructions;
create a first vector based on the dataflow analysis, wherein elements in the first vector comprise instructions contained in at least one of the first and second sets of instructions; and
create a cost matrix based on the first vector, the cost matrix contains the cost of merging the first and second sets of instructions.

22. A machine readable medium, as defined in claim 21, having instructions stored thereon that, when executed, cause the machine to:
estimate a cost of merging the first set of instructions and a third set of instructions; and
estimate a cost of merging the second set of instructions and the third set of instructions.

23. A machine readable medium, as defined in claim 21, having instructions stored thereon that, when executed, cause the machine to:
remove redundant instructions from the merged set of instructions; and
assign a physical mutual exclusion lock to the merged set of instructions.

24. A machine readable medium, as defined in claim 21, having instructions stored thereon that, when executed, cause the machine to update the first vector and the cost matrix after merging the first and second sets of instructions.

25. A machine readable medium, as defined in claim 21, having instructions stored thereon that, when executed, cause the machine to create a partition including the first and second sets of instructions before the first and second sets of instructions are merged.

* * * * *